(12) United States Patent
Matsumoto et al.

(10) Patent No.: US 8,130,975 B2
(45) Date of Patent: Mar. 6, 2012

(54) ON-VEHICLE ACOUSTIC APPARATUS

(75) Inventors: Yasuhiko Matsumoto, Tokyo (JP); Fukuya Iguchi, Tokyo (JP); Takao Yahiro, Tokyo (JP); Naoki Mori, Tokyo (JP); Shinnosuke Takahashi, Tokyo (JP); Akari Shimizu, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 996 days.

(21) Appl. No.: 11/991,932

(22) PCT Filed: Jul. 14, 2006

(86) PCT No.: PCT/JP2006/314061
§ 371 (c)(1),
(2), (4) Date: Mar. 13, 2008

(87) PCT Pub. No.: WO2007/037058
PCT Pub. Date: Apr. 5, 2007

(65) Prior Publication Data
US 2009/0154724 A1 Jun. 18, 2009

(30) Foreign Application Priority Data
Sep. 28, 2005 (JP) ................................. 2005-281719

(51) Int. Cl.
*H04B 1/00* (2006.01)
(52) U.S. Cl. ....................................................... 381/86
(58) Field of Classification Search .................... 381/86,
381/87, 300, 302, 366, 365, 389, 388, 387,
381/386, 184, 186, 334, 335; 701/207, 208,
701/209, 210, 211, 212, 213, 201, 202, 49;
340/990, 995; 342/357.01, 357.12, 357.1,
357.14
See application file for complete search history.

(56) References Cited

U.S. PATENT DOCUMENTS

| | | | |
|---|---|---|---|
| 3,493,634 A | 2/1970 | Kolycheck |
| 3,761,439 A | 9/1973 | Ward |
| 3,983,094 A | 9/1976 | O'Shea |
| 4,098,772 A | 7/1978 | Bonk |
| 4,124,572 A | 11/1978 | Mao |
| 4,379,904 A | 4/1983 | Erlich |
| 4,385,133 A | 5/1983 | Alberino |
| 4,522,975 A | 6/1985 | O'Connor |

(Continued)

FOREIGN PATENT DOCUMENTS
DE     199 27 188 A1     12/2000
(Continued)

OTHER PUBLICATIONS

Supplementary European Search Report issued from the European Patent Office on Jul. 14, 2010 in the corresponding European patent application No. 06768221.1.

(Continued)

Primary Examiner — Dao H Nguyen
Assistant Examiner — Tram H Nguyen
(74) Attorney, Agent, or Firm — Posz Law Group, PLC

(57) ABSTRACT

There is provided an acoustic apparatus whose front-side exterior appearance construction can be freely changed and which can be easily added with a new function.

A freely detachable control panel 2 is provided to an acoustic apparatus body 1 mounted on a vehicle 101, and audio units Au-1, Au-2, Au-3 which are connected to the acoustic apparatus body 1 through the control panel 2 are freely detachably provided to the control panel 2.

8 Claims, 18 Drawing Sheets

U.S. PATENT DOCUMENTS

| | | | |
|---|---|---|---|
| 4,784,123 A | | 11/1988 | Robeson |
| 4,912,174 A | | 3/1990 | Grouiller |
| 4,980,445 A | | 12/1990 | van Der wal |
| 5,127,057 A | | 6/1992 | Chapman |
| 5,167,899 A | | 12/1992 | Jezic |
| 5,229,925 A | | 7/1993 | Spencer et al. |
| 5,510,957 A | * | 4/1996 | Takagi ............... 361/814 |
| 5,618,904 A | | 4/1997 | Martin |
| 5,964,601 A | * | 10/1999 | Tsurumaru et al. .......... 439/141 |
| 6,610,811 B1 | | 8/2003 | Westfechtel |
| 6,675,232 B1 | | 1/2004 | Sato et al. |
| 6,681,176 B2 | * | 1/2004 | Funk et al. ............... 701/207 |
| 6,785,531 B2 | * | 8/2004 | Lepley et al. ............. 455/351 |
| 6,791,844 B2 | * | 9/2004 | Tobishima et al. .......... 361/759 |
| 6,797,215 B2 | | 9/2004 | Bonk |
| 6,824,703 B2 | | 11/2004 | Lawrey |
| 6,989,406 B1 | | 1/2006 | Arntz |
| 7,090,510 B1 | * | 8/2006 | Gatt ............... 439/76.1 |
| 7,117,286 B2 | * | 10/2006 | Falcon ............... 710/303 |
| 2002/0024597 A1 | * | 2/2002 | Arai et al. ............... 348/148 |
| 2011/0184640 A1 | * | 7/2011 | Coleman et al. ............. 701/201 |

FOREIGN PATENT DOCUMENTS

| | | |
|---|---|---|
| EP | 0 279 276 A2 | 8/1988 |
| EP | 0375128 A2 | 6/1990 |
| EP | 0 235 500 B1 | 11/1992 |
| FR | 1523720 | 5/1968 |
| GB | 1255660 A | 12/1971 |
| GB | 2361075 A | 10/2001 |
| JP | A-8-250946 | 9/1996 |
| JP | A-2000-149528 | 5/2000 |
| JP | A-2004-256108 | 9/2004 |
| JP | A-2005-206007 | 8/2005 |
| KR | 2003041267 * | 5/2003 |
| WO | WO 02/50151 | 6/2002 |

OTHER PUBLICATIONS

Office Action issued from the Japan Patent Office on Dec. 14, 2010 in corresponding Japanese Patent Application No. 2007-537544 (English translation enclosed).

Saunders, J.H., et al., "*Polyurethanes: Chemistry and Technology*", Part 1, Chemistry, Intersciences, 1962, New York, pp. 36-37.

Singh, A., et al., "*Thermal Stability of Polyester-vs. Polyether-Based Urethanes*" Rubber Age, Dec. 1966, vol. 98, No. 12, pp. 77-83.

International Search Report of the International Searching Authority mailed on Nov. 7, 2006 for the corresponding International patent application No. PCT/JP2006/314061.

Notification of Transmittal of Copies of Translation of the International Preliminary Report on Patentability received Apr. 10, 2008 in corresponding PCT application No. PCT/JP2006/314061 (and translation).

Office Action dated Sep. 1, 2011 in corresponding CN Application No. 201010521534.0 (and English Translation).

Office Action issued Nov. 24, 2011 in corresponding European Patent Application No. 06 768 221.1-1232.

* cited by examiner

ON-VEHICLE ACOUSTIC APPARATUS

FIELD OF THE INVENTION

The present invention relates to an on-vehicle acoustic apparatus.

BACKGROUND ART

An acoustic apparatus which can be prevented from being stolen when a driver gets away from a vehicle is known as an acoustic apparatus mounted in a vehicle such as a car or the like. There has been proposed an acoustic apparatus in which a control panel is freely detachably provided to the front surface of the main body of the acoustic apparatus, and a driver can detach only the operating unit from the main body of the acoustic apparatus and take out it when the driver gets away from a vehicle (for example, see Patent Document 1).
Patent Document 1: JP-A-08-250946

DISCLOSURE OF THE INVENTION

Problem to be Solved by the Invention

However, in the conventional technique, the front side of the main body of the acoustic apparatus is merely equipped with a control panel which constitutes a fixed exterior appearance at all times, and it is impossible for a user to freely change the exterior appearance construction in accordance with user's taste. Furthermore, when a function which is not provided to an acoustic apparatus being used is required, the acoustic apparatus itself must be exchanged by new one.

The present invention has been implemented in view of the above situation, and has an object to provide an acoustic apparatus in which the exterior appearance construction of the front side thereof can be freely changed and also that can be easily added with a new function.

Means of Solving the Problem

The present invention is characterized in that an acoustic apparatus mounted in a vehicle is provided with a freely detachable control panel, and an audio unit to be connected to the main body of the acoustic apparatus through the control panel is freely detachably provided to the control panel.

Here, it is preferable that the control panel has a rail to which the audio unit can be freely secured.

Furthermore, it is preferable that the rail is designed so that plural audio units having different audio functions can be freely secured to the rail.

Furthermore, it is preferable that an insertion for inserting the audio unit along the rail is formed on the side surface of the control panel, and the control panel is fitted to a fitting portion provided to the main body of the acoustic apparatus so as to hide the insertion portion.

Furthermore, it is preferable that the control panel has a projecting portion which is projected from the control panel to the audio unit by an urging portion, and the projecting portion is hooked to a receiving portion provided to the audio unit to fix the audio unit when the audio unit is located at a fixed position on the control panel.

Furthermore, it is preferable that the control panel and the audio unit have magnets so that the counter poles thereof face each other, and the audio unit is fixed to the control panel by the magnetic force of the magnets.

Furthermore, it is preferable that the control panel has an interface portion to be electrically connected to the main body of the acoustic apparatus through the interface portion.

Furthermore, it is preferable that the control panel has a common connector having plural control panel side terminals which are adaptable to any of the connectable audio units, and the audio unit has an individual connector having audio unit side terminals corresponding to at least some of the plural control panel side terminals.

Furthermore, it is preferable that the control panel has an interface portion to be electrically connected to the main body of the acoustic apparatus, and the common connector is electrically connected to the main body of the acoustic apparatus through the interface portion.

Effect of the Invention

According to the present invention, the exterior appearance construction (layout) of the front side of the acoustic apparatus can be freely changed, and also a new function can be easily added.

Figure 1:
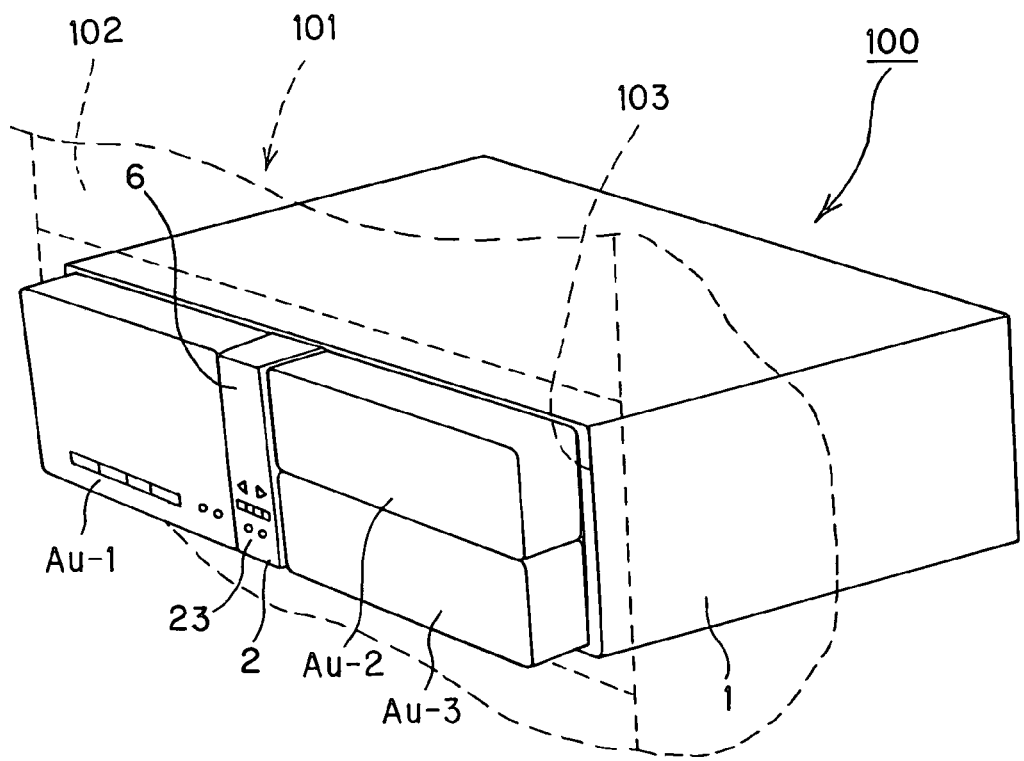
FIG. 1 is a perspective view showing the external appearance of an acoustic apparatus according to an embodiment of the present invention.

DESCRIPTION OF REFERENCE NUMERALS 1 main body of acoustic apparatus
2 control panel
11 interface portion
21 fitting portion
22 rail
25 side surface
26 insertion portion
28 spring (urging portion)
29 projecting portion
30 receiving portion
34 common connector
35 individual connector
36 control panel side terminal
37 audio unit side terminal
38 control panel side magnet
39 audio unit side magnet
100 acoustic apparatus (on-vehicle acoustic apparatus)
101 . . . vehicle
Au-1 audio operating/equalizer unit (audio unit)
Au-2 audio player unit (audio unit)
Au-3 radio unit (audio unit)

BEST MODES FOR CARRYING OUT THE INVENTION

An embodiment of the present invention will be described hereunder.

FIG. 1 is a perspective view showing the exterior appearance of an acoustic apparatus (on-vehicle acoustic apparatus) 100 according to this embodiment. As shown in FIG. 1, the acoustic apparatus 100 has an acoustic apparatus body 1 to be fitted in a predetermined mount space 103 provided to a dashboard 102 of a vehicle 101. A control panel 2 and plural audio units which are freely detachably secured to the control panel 2 are provided at the front side of the acoustic apparatus body 1. The acoustic apparatus 100 has, as audio units, an audio operating/equalizer unit Au-1 which serves as an equalizer and operates each audio unit secured to the control panel 2 by a user, an audio player unit Au-2 as a solid state player and a radio unit Au-3 for operating a tuner portion 32 (see FIG. 2) provided to the acoustic apparatus body 1 by the user. In the following description, when the type of the audio unit is not particularly identified, these audio units are represented by audio unit Au. The control panel 2 is provided with an operation panel 23. The operation panel 23 is a user interface for performing various kinds of operations of the acoustic apparatus 100 excluding the respective audio units Au and the tuner portion 32 by the user, and is equipped with plural operation switches and operation buttons.

Figure 2:
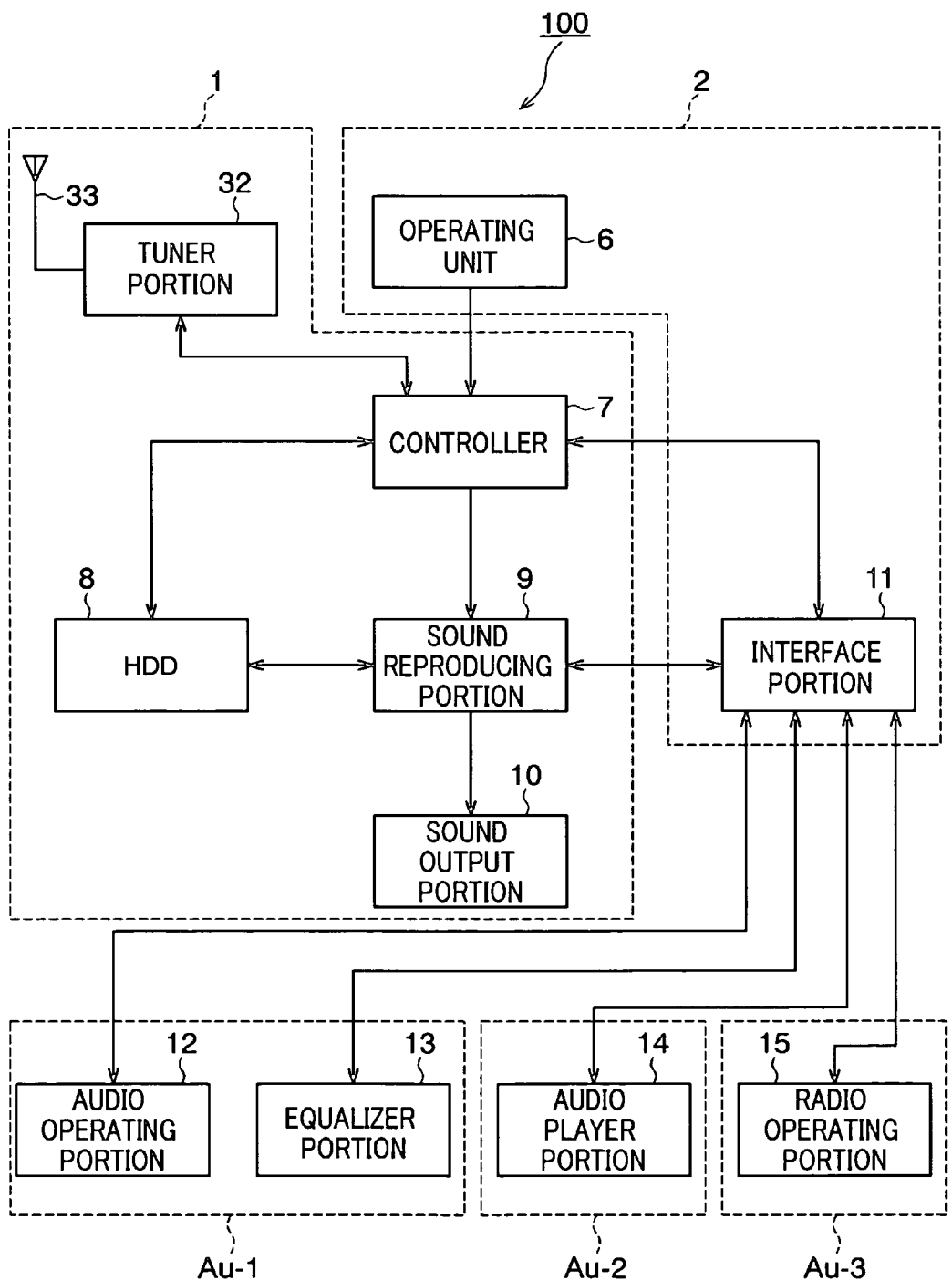
FIG. 2 is a block diagram showing the functional construction of the acoustic apparatus.

FIG. 2 is a block diagram showing the construction of the acoustic apparatus 100 according to this embodiment. In FIG. 2, the controller 7 controls the respective parts of the acoustic apparatus 100 and executes various kinds of calculation processing. The controller 7 is equipped with ROM for storing a control program and control data in advance, CPU for controlling the whole of the acoustic apparatus 100 on the basis of the control program in ROM, and RAM for temporarily storing various kinds of data.

The operating portion 6 is a user interface for executing various kinds of operations of the acoustic apparatus 100, and is equipped with an operation panel 23 provided to the control panel 2.

The tuner portion 32 is equipped with an antenna 33, and achieves radio broadcasting electric waves through the antenna 33. This tuner portion 32 outputs the audio signal based on the obtained radio broadcasting electric waves to the controller 7 under the control of the controller 7.

HDD 8 is designed so that plural audio information can be stored therein, and outputs selected audio information to sound reproducing portion 9 under the control of the controller 7.

The sound reproducing portion 9 reproduces the selected audio information under the control of the controller 7, and outputs the reproduced audio signal to a sound output portion 10.

The sound output portion 10 outputs sounds to a speaker (not shown) on the basis of the audio signal reproduced in the sound reproducing portion 9 under the control of the controller 7, and is quipped with DSP (Digital Signal Processor), an electric volume circuit for adjusting sound volume and an amplifier.

The interface portion 11 is disposed on the control panel 2, and it is an interface for electrically connecting the control panel 2 to the various kinds of audio units Au secured to the control panel 2 and mediating signal transmission and reception. In this embodiment, an audio operating portion 12, an equalizer 13, an audio player portion 14 and a radio operating unit 15 are provided as internal equipment mounted in the audio unit Au secured to the control panel 2, and the audio operating portion 12, the equalizer portion 13, the audio player portion 14 and the radio operating portion 15 are electrically connected to the interface portion 11.

The audio operating portion 12 is a user interface for operating each audio unit Au secured to the control panel 2 by the user.

The equalizer portion 13 is an electrical circuit for processing/adjusting the overall frequency characteristic of the audio signal.

The audio player portion 14 is a solid state player constructed by a semiconductor or the like.

The radio operating unit 15 is a user interface for operating the tuner portion 32 by the user. This radio operating portion 15 has a display panel (not shown), and displays the frequency band of radio broadcasting electric waves received by the tuner portion 32.

Figure 3:
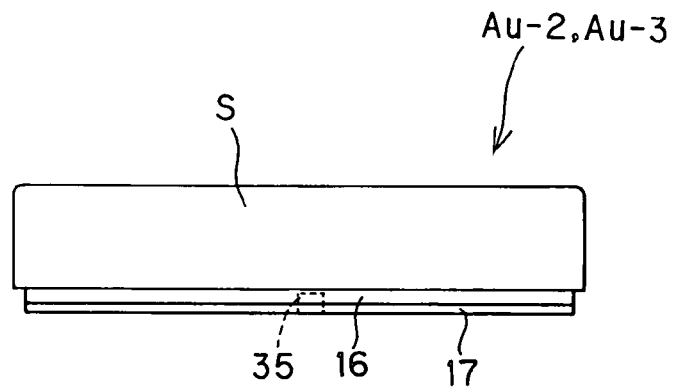
FIG. 3 is a bottom view of an audio unit mounted in a compact audio unit case.
Figure 4:
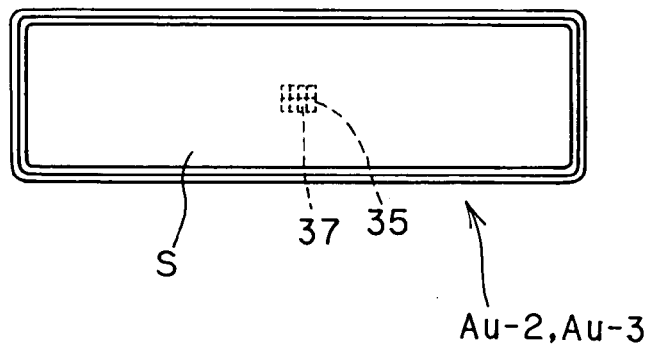
FIG. 4 a front view of the audio unit mounted in the compact audio unit case.
Figure 5:
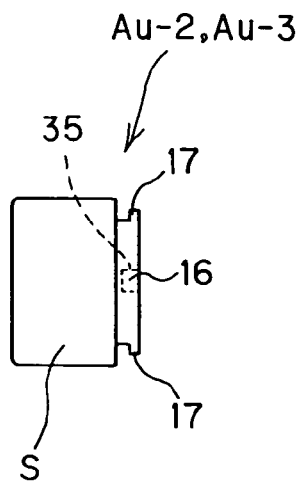
FIG. 5 is a side view of the audio unit mounted in the compact audio unit case.

FIG. 3 is a bottom diagram showing the audio units Au-2, Au-3 mounted in a compact audio unit case S. FIG. 4 is a front view of the audio units Au-2, Au-3 mounted in the compact audio unit case S. FIG. 5 is a side view of the audio units Au-2, Au-3 mounted in the compact audio unit case S.

The audio player portion 14 is mounted in the compact audio unit case S having a rectangular housing as shown in FIG. 3, thereby constituting the audio player unit Au-2.

As in the case of the audio player portion 14, the radio operating unit 15 is mounted in the compact audio unit case S, thereby constituting the radio unit Au-3.

The compact audio unit case S is equipped with a securing portion 16 on a surface thereof to be secured to the control panel 2 so that the securing portion is inserted and secured to the control panel 2. The securing portion 16 projects to the control panel 2, and extends fully in the longitudinal direction of the compact audio unit case S. The securing portion 16 is equipped with hook portions 17 at both the ends in the width direction thereof, the hook portions 17 projecting outwardly in the width direction and extending fully in the longitudinal direction of the securing portion 16.

Figure 6:
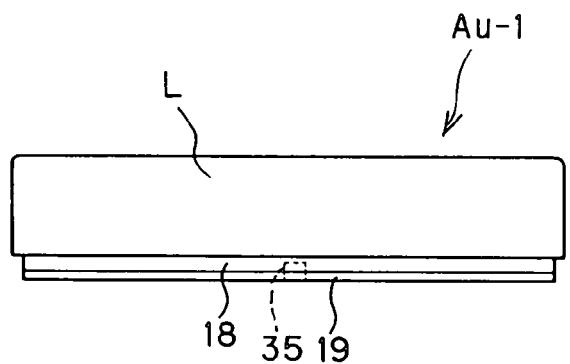
FIG. 6 is a bottom view of the audio unit mounted in a large-size audio unit case.
Figure 7:
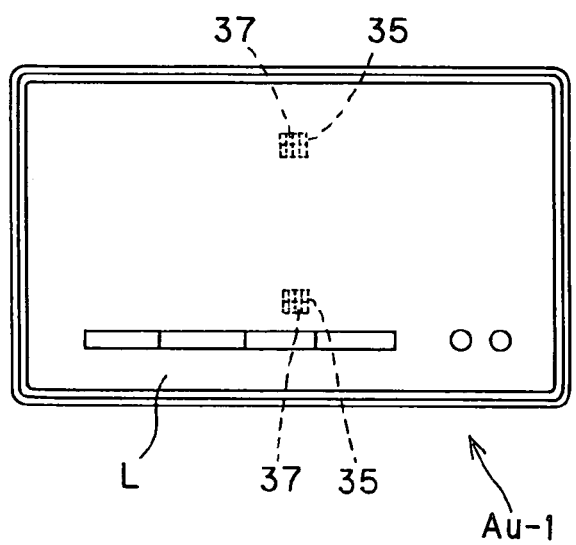
FIG. 7 is a front view of the audio unit of the large-size audio unit case.
Figure 8:
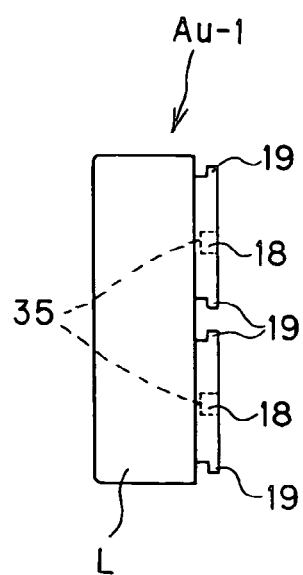
FIG. 8 is a side view of the audio unit mounted in the large-size audio unit case.

FIG. 6 is a bottom view of the audio unit Au-1 mounted in a large-size audio unit case L. FIG. 7 is a front view of an audio unit Au-1 mounted in a large-size audio unit case L. FIG. 8 is a side view of the audio unit Au-1 mounted in the large-size audio unit case L.

The audio operating portion 12 and the equalizer portion 13 are mounted in the large-size audio unit case L having a rectangular housing as shown in FIG. 6, thereby constituting the audio operating/equalizer unit Au-1.

As in the case of the compact audio unit case S, the large-size audio unit case L has a securing portion 18 to be inserted and secured to the control panel on a securing surface thereof to be secured to the control panel 2. The width of large-size audio unit case L is about twice as large as the compact audio unit case S, and thus has two securing portions 18 arranged in parallel in the longitudinal direction. The securing portion 18 is the same as the securing portion 16 provided to the compact audio unit case S. The securing portion 18 projects to the control panel 2, and extends fully in the longitudinal direction of the large-size audio unit case L. Furthermore, the securing portion 18 has hook portions 19 at both the ends in the width direction thereof, the hook portions 19 projecting outwardly in the width direction and fully extending in the longitudinal direction of the securing portion 18.

Figure 9:
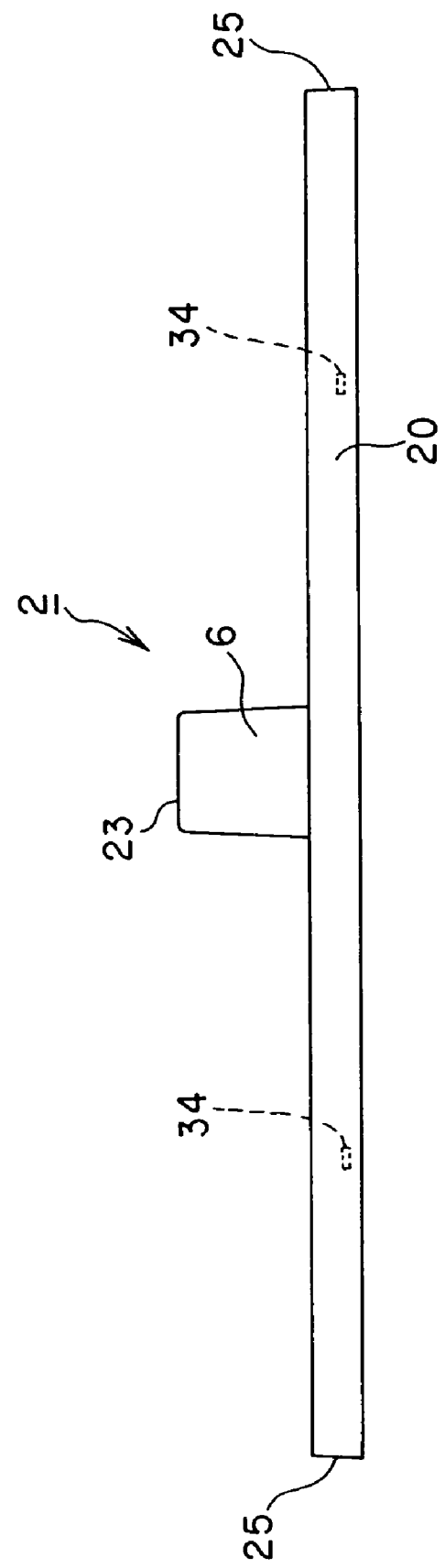
FIG. 9 is a bottom view of a control panel.
Figure 10:
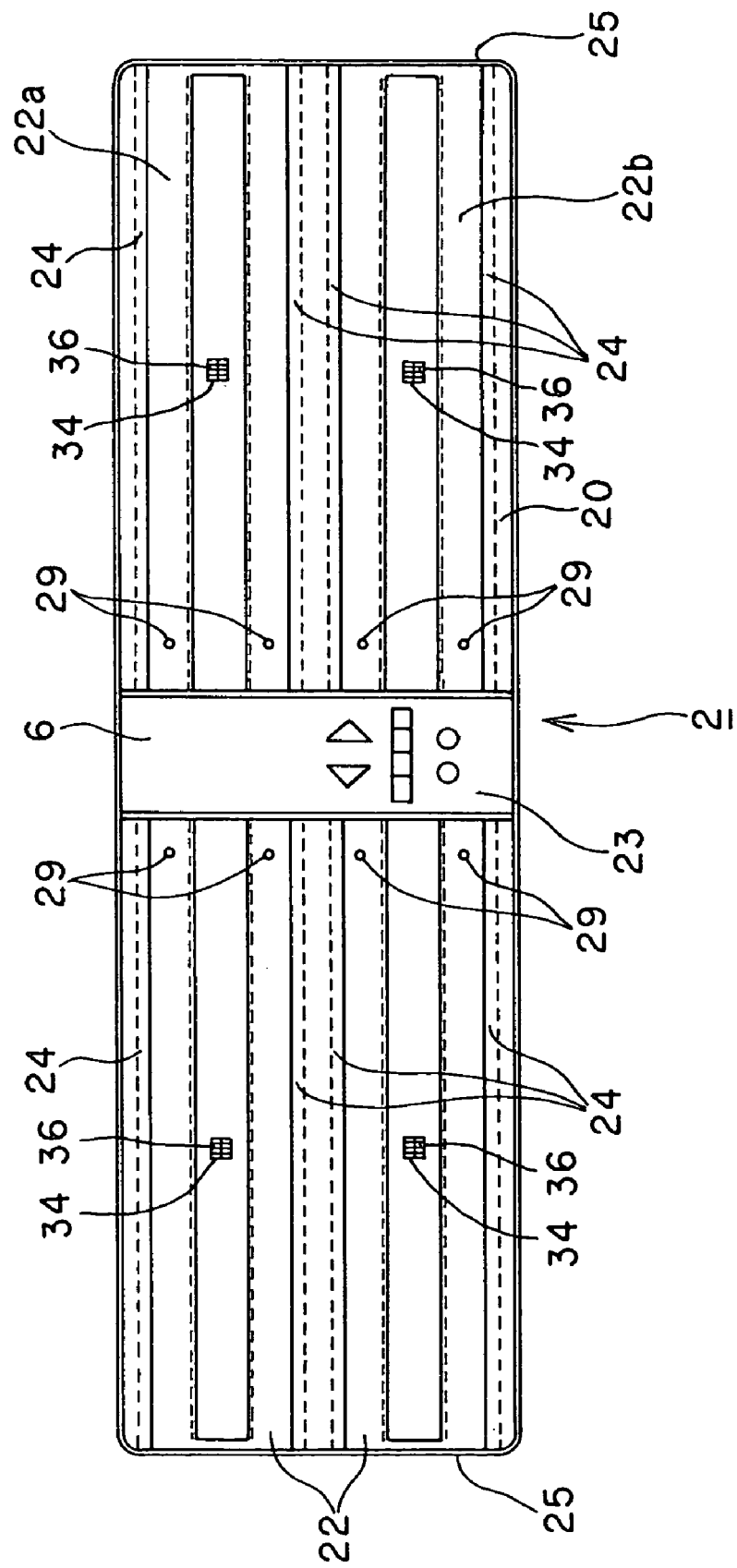
FIG. 10 is a front view of the control panel.
Figure 11:
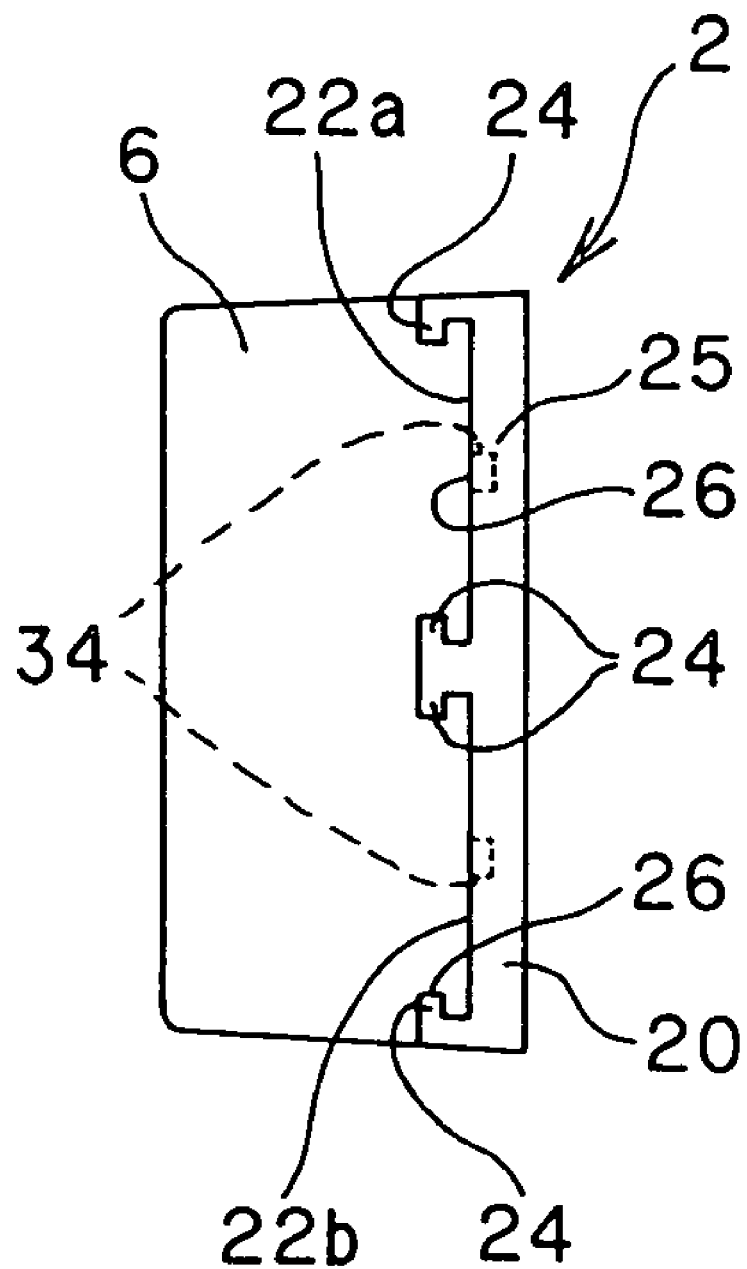
FIG. 11 is a side view of the control panel.

FIG. 9 is a bottom view of the control panel. FIG. 10 is a front view of the control panel. FIG. 11 is a side view of the control panel.

The control panel 2 to which the audio operating/equalizer unit Au-1, the audio player unit Au-2 and the radio unit Au-3 are secured has a rectangular operating portion 6 at the center of a plate-shaped main-body detachable portion 20 as shown in FIG. 10. The width dimension of the main-body detachable portion 20 and the operating portion 6 are set to be substantially equal to the width dimension of the large-size audio unit case L, that is, set to be about twice as large as the width dimension of the compact audio unit case S.

The operating portion 6 is provide with the operation panel 23 at the front side thereof. Every two rails for securing the audio unit Au are provided on the main-body detachable portion 20 at right and left sides of the operating portion 6 so as to be parallel to the longitudinal direction of the main-body detachable portion 20. Each rail 22 is provided so as to extend from the side surface 25 to the operating portion 6. Rail hook portions 24 to be hooked to the hook portions 17, 19 of the audio unit Au are provided at both the ends in the width direction of the rail 22. The rail hook portion 24 is designed to project to the inside of the rail and extend along the rail 22. An insertion portion 26 for inserting the securing portions 16, 18 of the audio unit Au is provided on the side surface 25 of the main-body detachable portion 20, and the audio unit Au is inserted from the lateral direction of the control panel 2.

Figure 12:
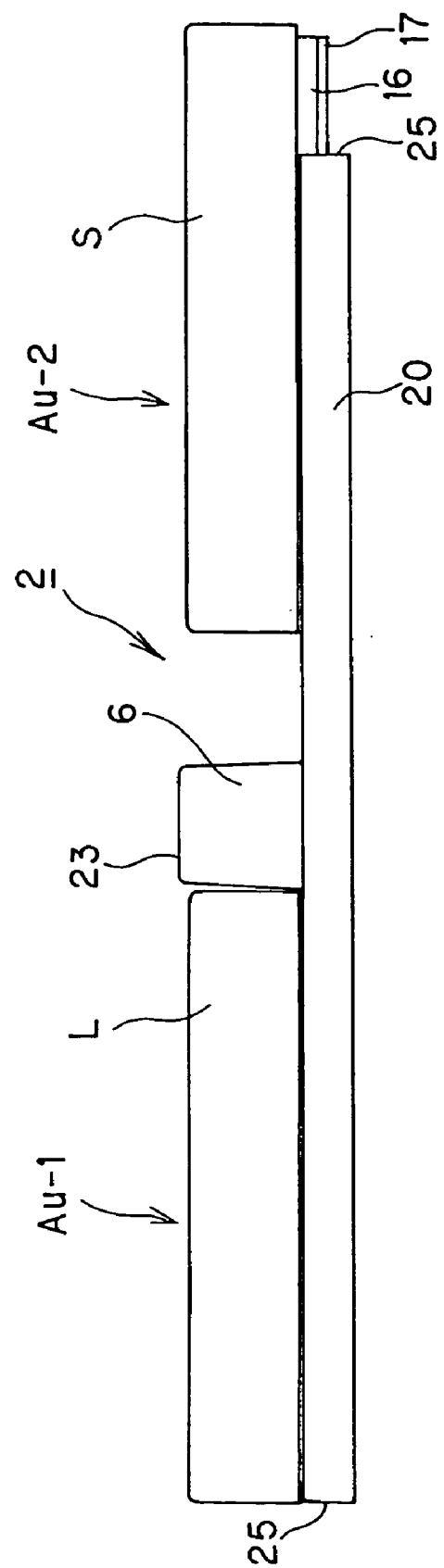
FIG. 12 is a bottom view when the audio unit is inserted in the control panel.
Figure 13:
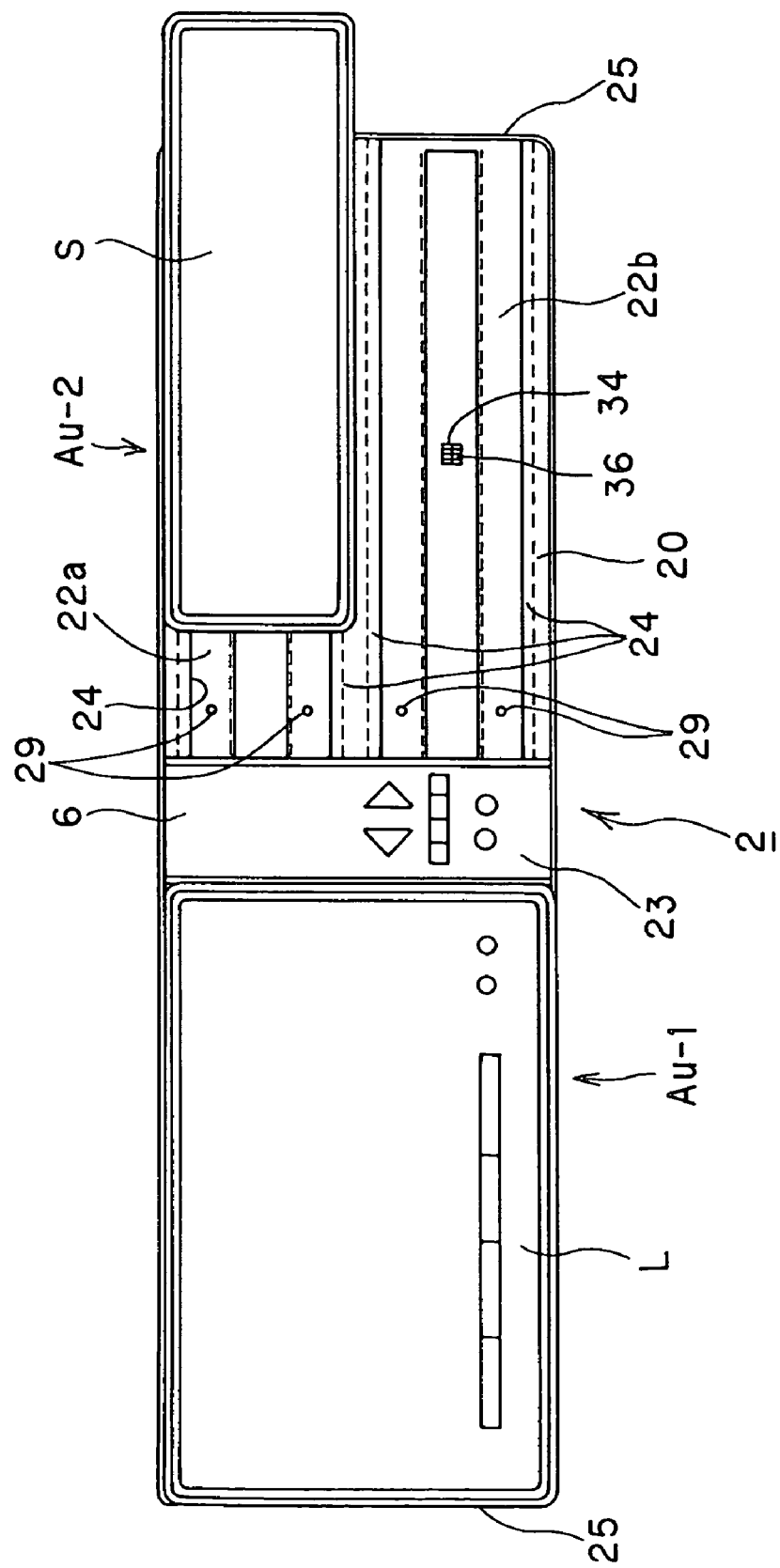
FIG. 13 is a front view when the audio unit is inserted in the control panel.
Figure 14:
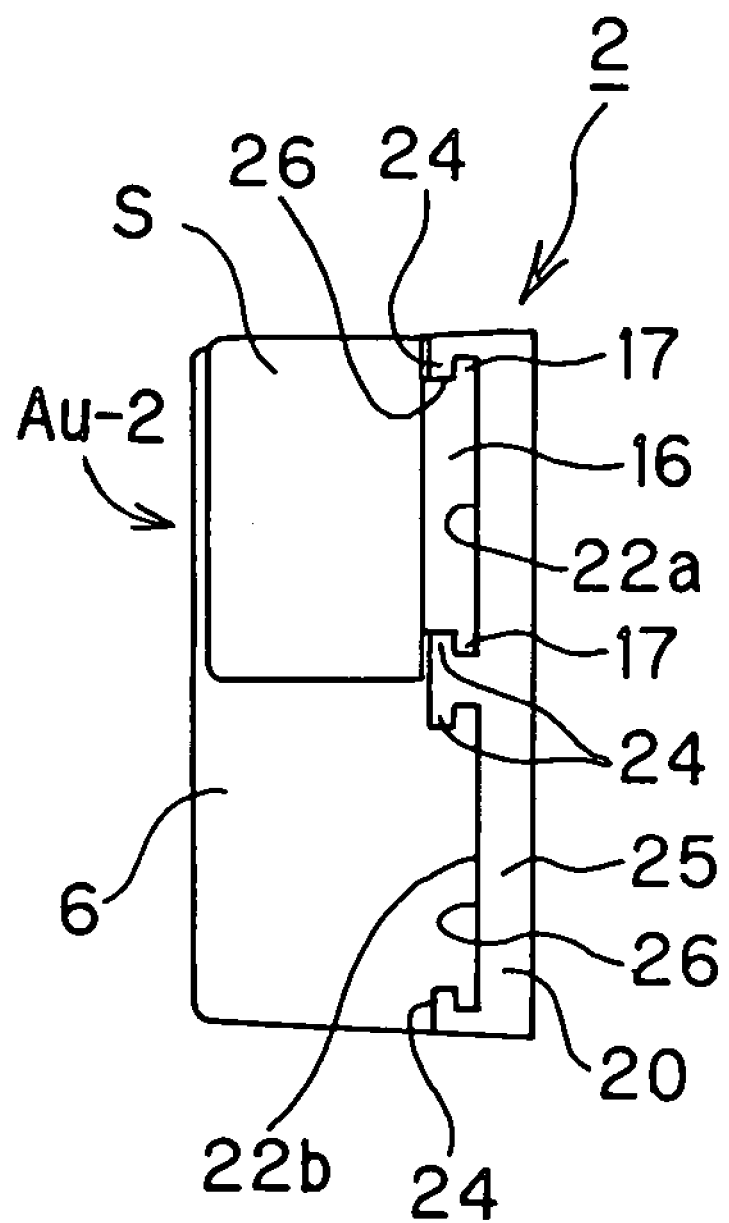
FIG. 14 is a side view when the audio unit is inserted in the control panel.

FIG. 12 is a bottom view when the audio unit Au is inserted into the control panel 2. FIG. 13 is a front view when the audio unit Au is inserted into the control panel 2. FIG. 14 is a side view when the audio unit Au is inserted into the control panel 2.

When the audio unit Au is secured to the control panel 2, the securing portions 16, 18 of the audio unit Au are inserted from the insertion portion 26 in the longitudinal direction of the main-body detachable portion 20. FIG. 13 shows a state that the audio operating/equalizer unit Au-1 is secured to the two rails 22 at the left side of the control panel 2 and the audio player unit Au-2 is being inserted to the upper-state rail 22a out of the two rails 22 at the right side, that is, the rails 22a, 22b. When the securing portion 16 is inserted from the insertion portion 26, the securing portion 16 is slide all the way along the rail 22a. At this time, the hook portion 17 is fitted and hooked to the rail hook portion 24 of the rail 22a because the securing portion 16 is provided with the hook portion 17. Accordingly, the movement of the respective audio units Au such as the audio player unit Au-2, etc. to the front side of the control panel 2 is regulated.

Figure 15:
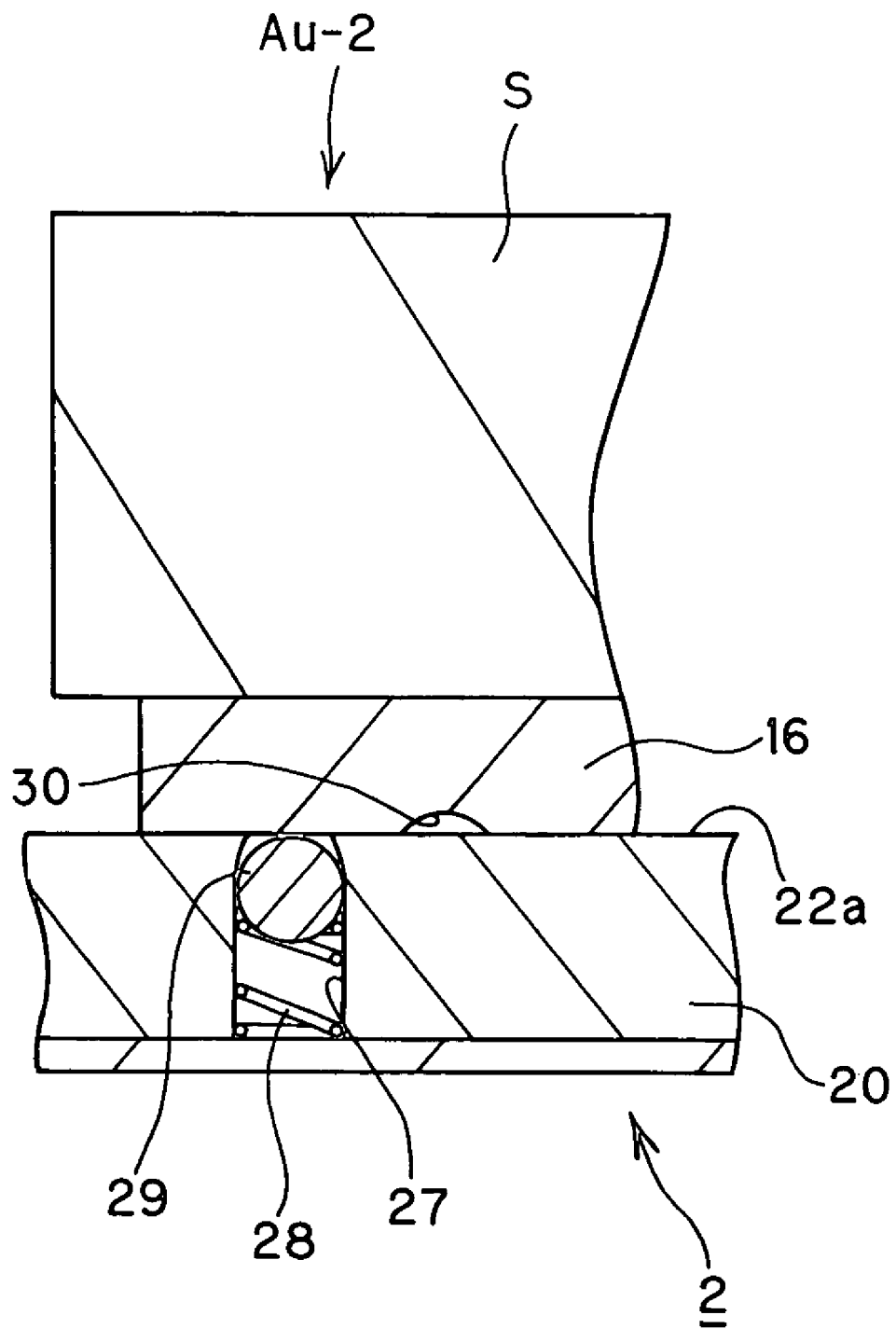
FIG. 15 is a cross-sectional view showing an aspect that a projecting portion abuts against the bottom surface of a securing portion.
Figure 16:
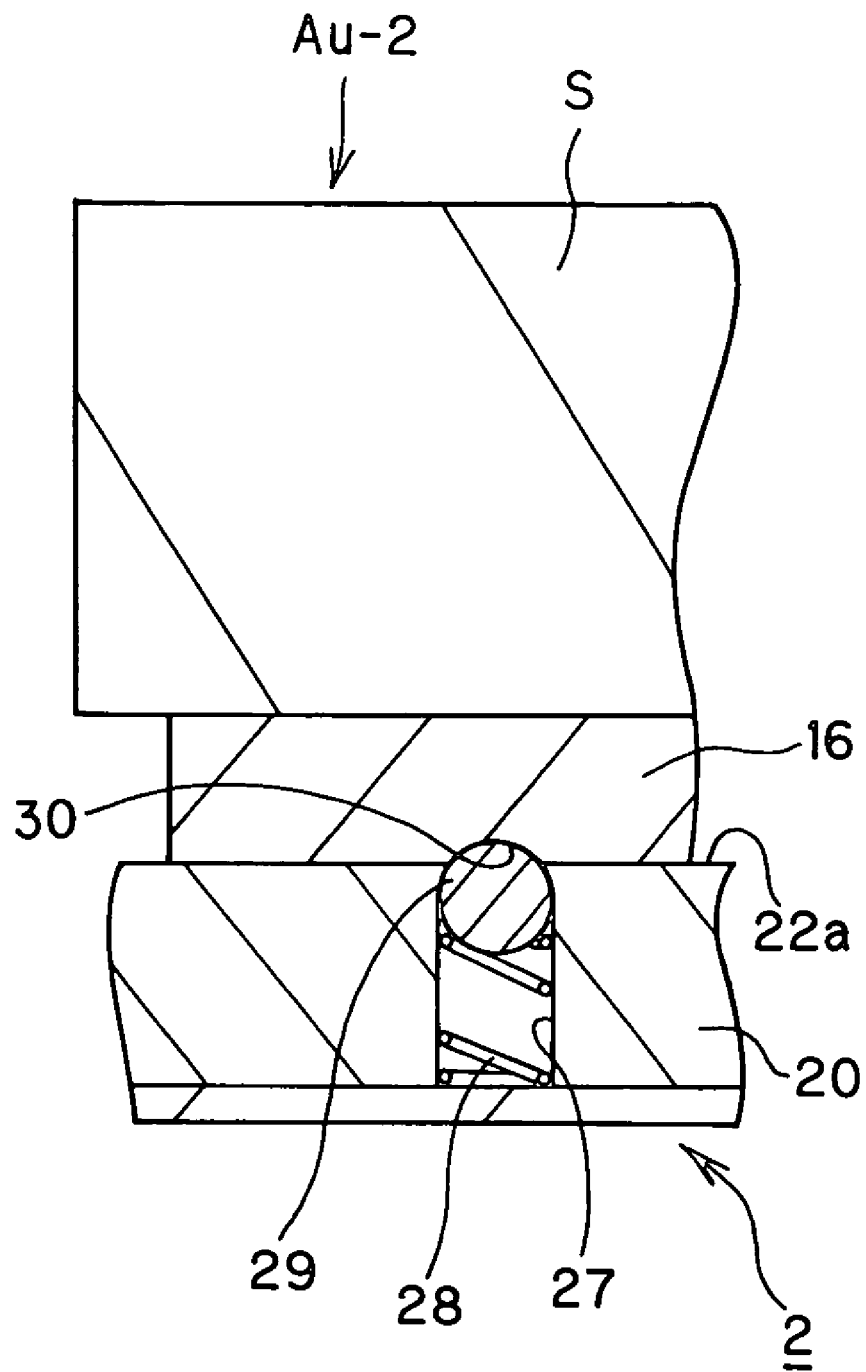
FIG. 16 is a cross-sectional view showing an aspect that the projecting portion is fitted to a receiving portion.

FIG. 15 is a cross-sectional view showing an aspect that the projecting portion 29 abuts against the bottom surface of the securing portion 16. FIG. 16 is a cross-sectional view showing an aspect that the projecting portion 29 is fitted to the receiving portion 30.

As shown in FIG. 15, every two projection accommodating holes 27 are provided in the neighborhood of the side end portion of the operating portion 6 of each rail 22 in the main-body detachable portion 20. FIG. 15 shows an aspect that the audio player unit Au-2 is inserted in the rail 22a. In the projection accommodating hole 27 are disposed a projecting portion 29 as a metal ball and a spring (urging portion) 28 for making the projecting portion 29 project to the outside of the projection accommodation hole 27. The projection accommodating hole 27 is formed so that the inner diameter of the end portion at the rail 22 side is smaller than the outer shape of the projecting portion 29. Accordingly, even when the projecting portion 29 is pushed to the outside of the projection accommodating hole 27 by the urging force of the spring 28, the projection portion 29 can be prevented from perfectly dropping out of the projection accommodating hole 27. The securing portion 16 is provided with the receiving portions 30 to be fitted to the projection portion projecting to the outside of the projection accommodating hole 27. The receiving portions 30 are provided in the neighborhood of both the ends in the longitudinal direction of the securing portion 16, and they can be fitted to any projecting portions 29 of the rails 22 which are provided at the right and left sides of the main-body detachable portion 20 two by two. Every two receiving portions 30 are provided in the neighborhood of both the ends in the longitudinal direction of the compact audio unit case S, and every four receiving portions 30 are provided in the neighborhood of both the ends in the longitudinal direction of the large-size audio unit case L.

The audio unit Au such as the audio player unit Au-2 or the like is inserted into the control panel 2 and the securing portion 16 is slid along the rails 22, the projecting portions 29 abut against the bottom surface of the securing portion 16 as shown in FIG. 15. Accordingly, the projecting portions 29 can be pressed in the projection accommodating holes 27 without projecting from the projection accommodating holes 27.

When the securing portion 16 is inserted all the way along the rail 22 and reaches a fixed position, the receiving portion 30 and the projection accommodating hole 27 are positionally coincident with each other as shown in FIG. 16. At this time, the projecting portion 29 projects from the projection accommodating hole 27 by the urging force of the spring 28, and fitted and hooked to the receiving portion 30. The projecting portion 29 is fitted and hooked to the receiving portion 30, whereby the sliding movement of the securing portion 16 on the rail 22 is regulated. Here, when force in the slide direction of the rail 22 is applied to the projecting portion 29, the receiving portion 30 abuts against the projecting portion 29, and force of pressing the projecting portion 29 against the bottom portion of the projection accommodating hole 27 occurs. At this time, when the force of pressing the projecting portion 29 is larger than the urging force of the spring 28, the projecting portion 29 is pressed till a position at which the projecting portion 29 is not projected from the projection accommodating hole 27, and the hook between the projecting portion 29 and the receiving portion 30 is released. The securing portion 18 of the large-audio unit case L ha the same construction as the securing portion 16 of the compact audio unit case S.

When each audio unit Au is secured to the control panel 2, each audio unit Au and the control panel 2 are electrically connected to each other. The control panel 2 has an input/output terminal of audio signals, a power supply terminal, a control signal terminal and a digital input/output terminal as control panel side terminals 36, and has plural common connectors 34 which are electrically connected to the interface portion 11 of the control panel 2. Each audio unit Au secured to the control panel 2 has an individual connector 35 having audio unit side terminals 37 which correspond to at least some of the input/output terminal of the audio signals, the power supply terminal, the control signal terminal and the digital input/output terminal. Each audio unit Au is connected to a common connector 34 through the individual connector 35, and thus connected to the control panel 2. Each common connector 34 is provided every rail 22, and the individual connector 35 of each audio unit Au is connectable to any of the common connectors 34. Therefore, each audio unit Au and the control panel 2 can be easily electrically connected to each other even when the rail 22 to which the audio unit Au is secured is changed.

Here, the individual connector 35 provided to the audio operating/equalizer unit Au-1 has at least the input/output terminals for audio signals, the power supply terminal and the control signal terminal as the audio unit side terminals 37. The individual connector 35 provided to the audio player unit Au-2 has at least the power supply terminal, the control signal terminal and the digital input/output terminal as the audio unit side terminals 37. The individual connector 35 provided to the radio unit Au-3 has at least the power supply terminal and the control signal terminal as the audio unit side terminals 37.

Figure 17:
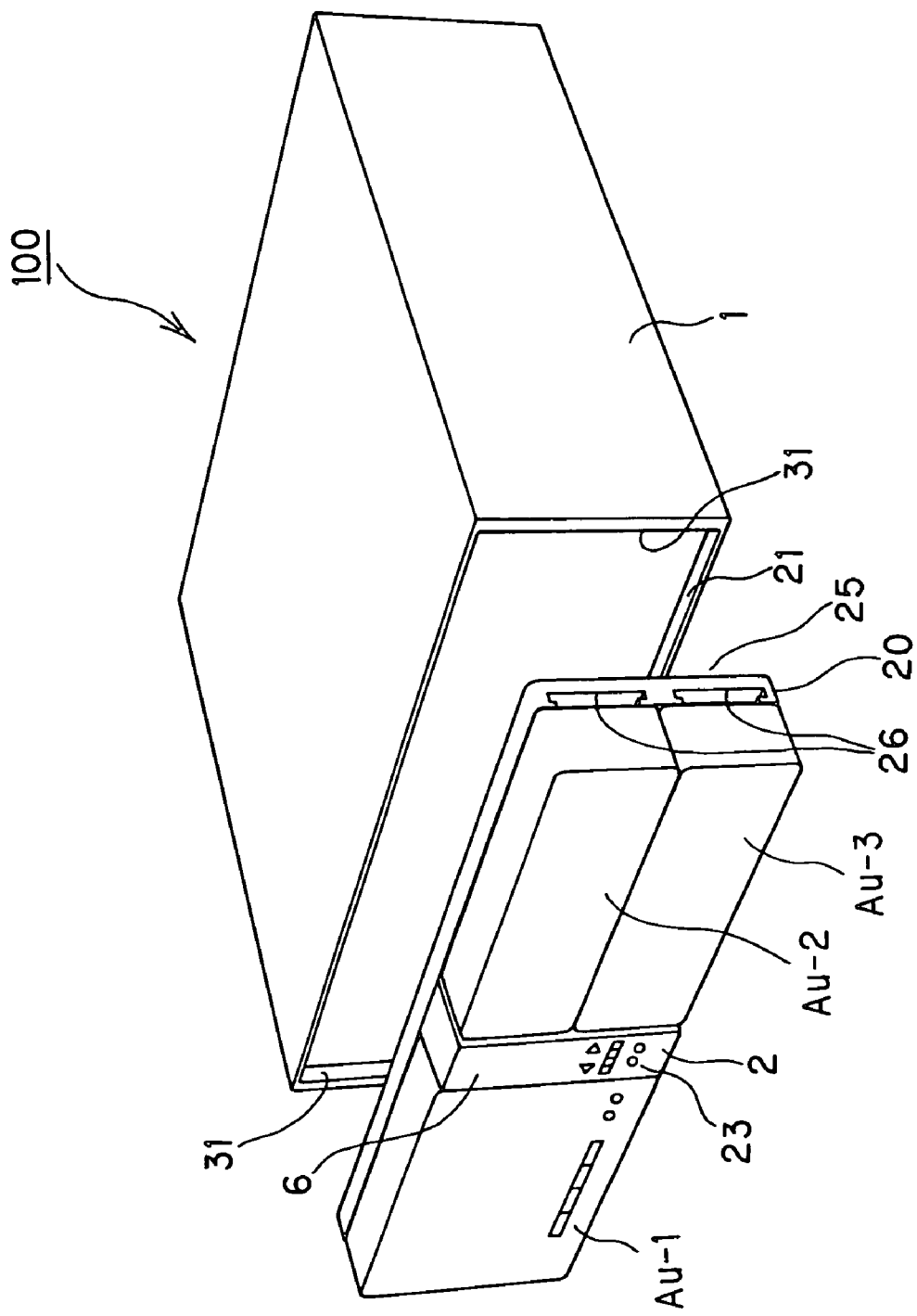
FIG. 17 is a perspective view when the control panel is inserted into the main body of the acoustic apparatus.

When the audio operating/equalizer unit Au-1, the audio player unit Au-2 and the radio unit Au-3 are secured to the control panel 2, the control panel 2 is secured to the acoustic apparatus body 1 as shown in FIG. 17. At this time, the control panel 2 is secured to the acoustic apparatus body 1 by magnet or the like, and the control panel 2 and the acoustic apparatus body 1 are connected to each other by a collecting connector (not shown) in which the plural common connectors 34 described above are bundled into one body The front portion of the acoustic apparatus body 1 is provided with a recess-shaped fitting portion 21 to which the main body detachable portion 20 of the control panel 2 is fitted. When the main body detachable portion 20 is fitted in the fitting portion 21, the inner wall 31 of the fitting portion 21 covers the side surface 25 of the main body detachable portion 20, the insertion portion 26 is sealed. Accordingly, the audio unit Au is prevented from dropping out of the main body detachable portion 20, and furthermore, the audio unit Au can be made freely detachable without exposing the insertion portion 26 to the outside as shown in FIG. 1.

Figure 18:
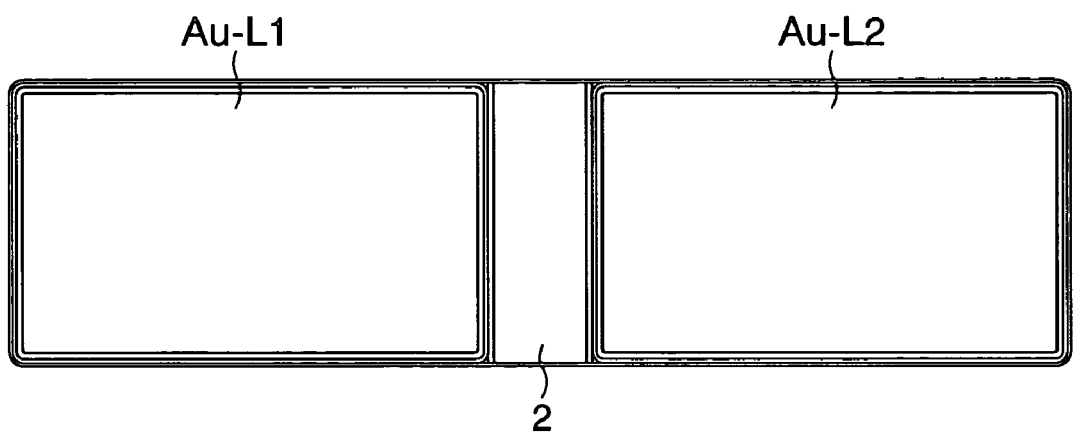
FIG. 18 is a front view showing a combination example of audio units.
Figure 19:
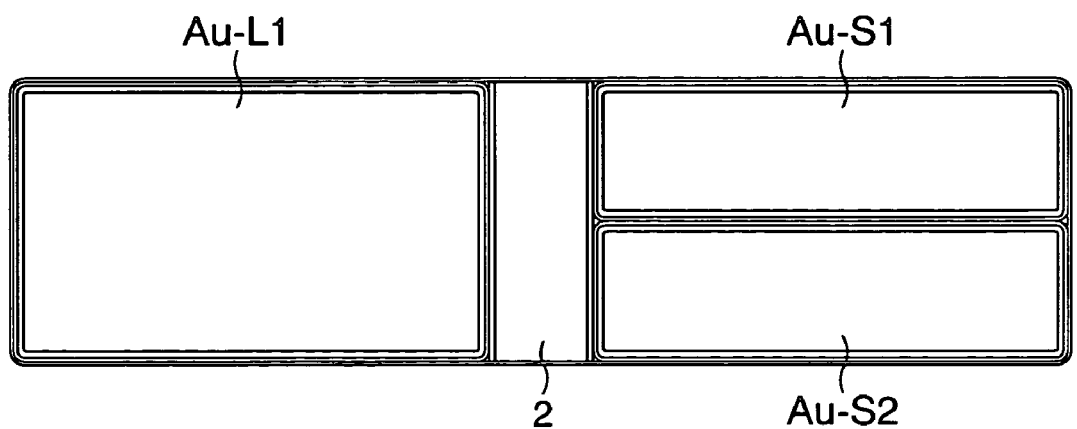
FIG. 19 is a front view showing a combination example of audio units.
Figure 20:
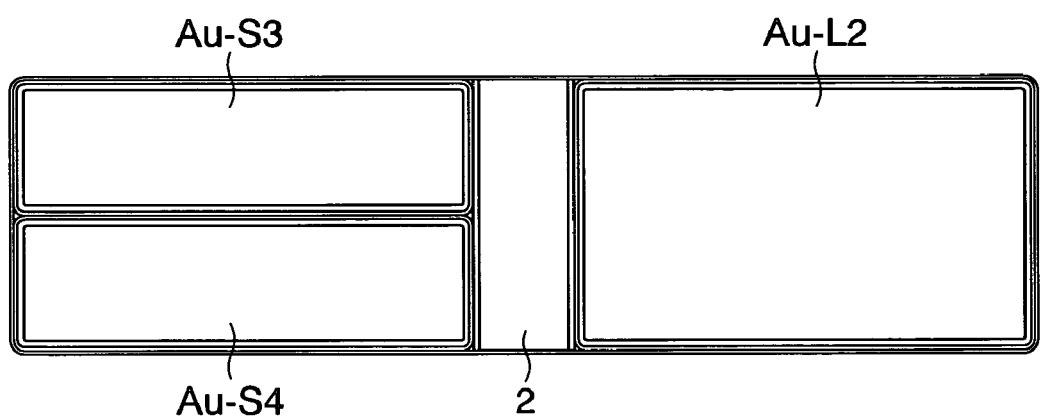
FIG. 20 is a front view sowing a combination example of the audio units.
Figure 21:
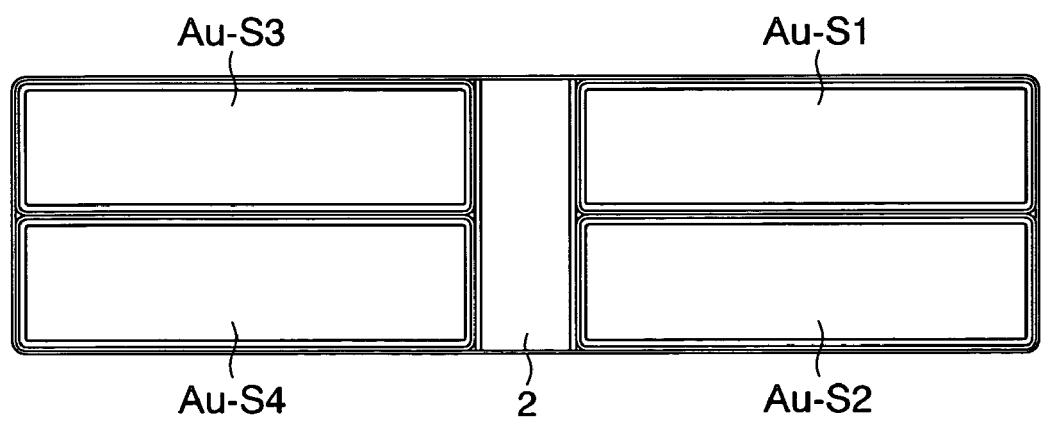
FIG. 21 is a front view showing a combination example of the audio units.

According to this invention, the various kinds of audio units Au as unitized audio equipment can be secured to the control panel 2 while easily and freely combined with one another. Therefore, the exterior appearance construction (combination way) of the front side of the acoustic apparatus 100 can be changed in accordance user's taste and user-friendliness. For example, in FIG. 18, large-size audio units Au-L1, Au-L2 having the same shape as the audio operating/equalizer unit Au-1 mounted in the large-size audio unit case L are disposed on the right and left rails 22 of the control panel 2. In FIG. 19, the large-size audio unit Au-L1 is disposed on the left-side rails 22 of the control panel 2, and compact audio units Au-S1 and Au-S2 having the same shapes as the audio player unit Au-2 and the radio unit Au-3 mounted in the compact audio unit cases S are disposed on the right-side rails 22 of the control panel 2. In FIG. 20, compact audio units Au-S3 and Au-S4 having the same shapes as the compact audio units Au-S1 and Au-S2 are disposed on the left-side rails 22 of the control panel 2, and a large-size audio unit Au-L2 is disposed on the right-side rails 22 of the control panel 2. In FIG. 21, compact audio units Au-S3 and Au-S4 are disposed on the left-side rails 22 of the control panel 2, and compact audio units Au-S1 and Au-S2 are disposed on the right-side rails 22 of the control panel 2. As described above, the user can easily and freely combine various kinds of audio units Au, and thus the various kinds of audio units Au can be combined in accordance with user's taste or so that the user can easily operate the acoustic apparatus 100.

Furthermore, according to the present invention, a user can easily add a new function which has not been equipped to the acoustic apparatus 100 till now by merely securing and connecting an audio unit Au having the new function. Accordingly, for example, by merely securing and connecting an audio unit Au functioning an interface of a portable memory audio, the acoustic apparatus 100 can be made adaptable to the portable memory audio. Furthermore, for example, by merely securing and connecting an audio unit Au functioning as a radio tuber adapted to the frequency band of each country or district, the acoustic apparatus 100 can receive radio broadcasting of the frequency band corresponding to the country or district.

The present invention has been described above on the basis of one embodiment, however, the present invention is not limited to the embodiment. In the above-described embodiment, every two projecting portions 29 to be fitted to the receiving portions 30 provided to the audio unit Au are provided in the neighborhood of the end portion of each rail 22 at the operating portion 6 side, however, the present invention is not limited to this style. For example, the projecting portion 29 may be provided at the center of each rail 22 in the slide direction, or the number of the projecting portions 29 provided to each rail 22 is not limited to two.

Figure 22:
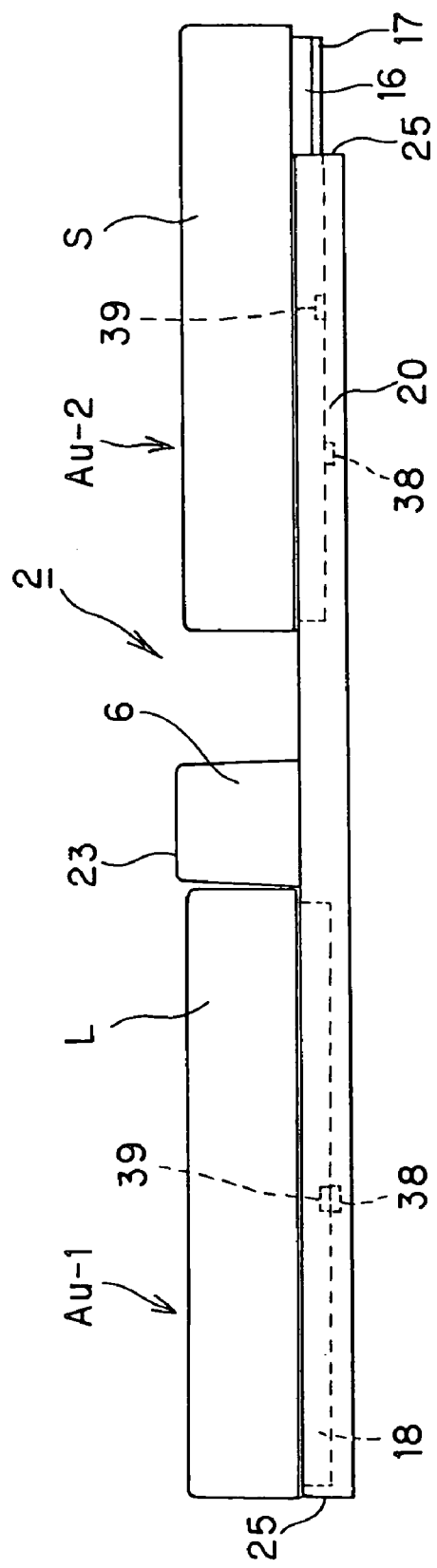
FIG. 22 is a bottom view showing an acoustic apparatus according to a modification.
Figure 23:
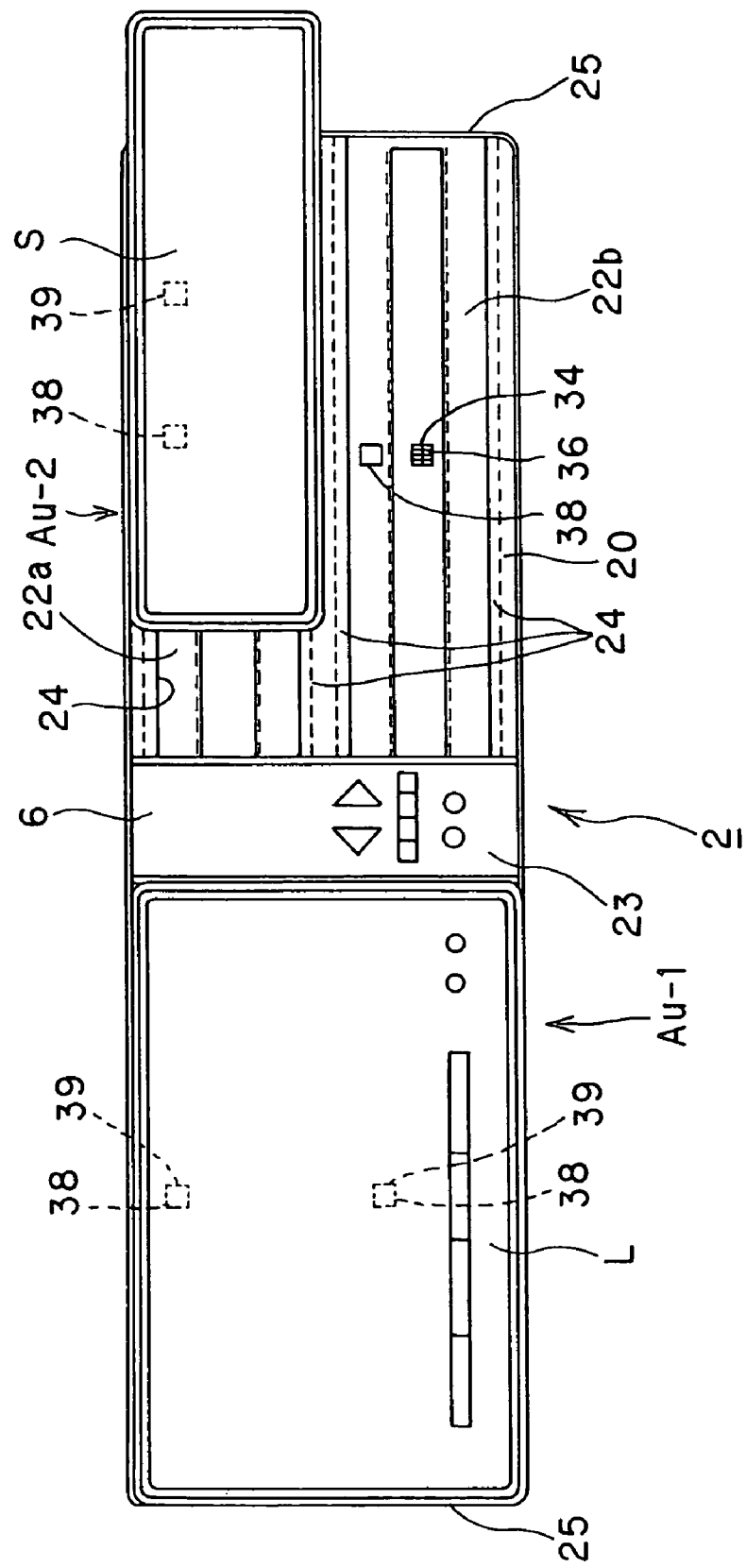
FIG. 23 is a front view showing an acoustic apparatus according to a modification.
Figure 24:
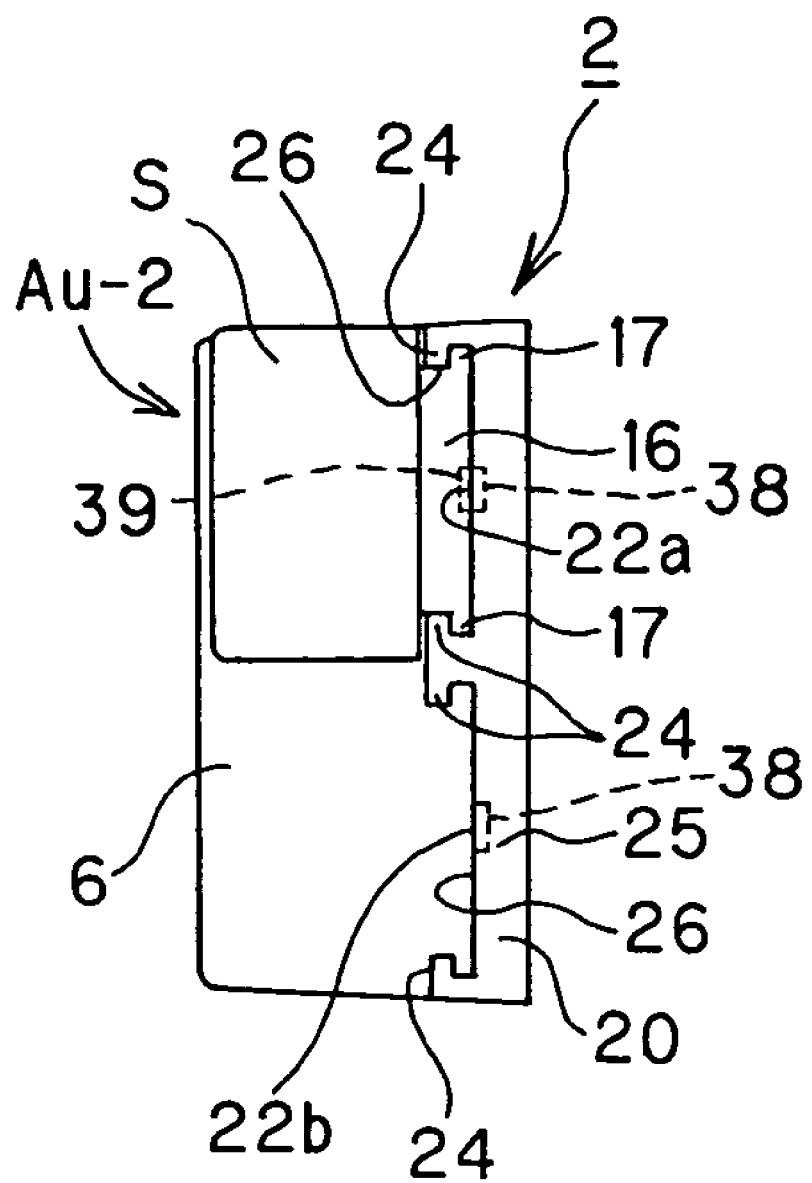
FIG. 24 is a side view showing the acoustic apparatus according to a modification.

FIG. 22 is a bottom view showing the acoustic apparatus according to a modification. FIG. 23 is a front view showing the acoustic apparatus according to the modification. FIG. 24 is a side view showing the acoustic apparatus according to the modification.

In the above-described embodiment, the projecting portion 29 which is projected by the spring 28 is provided to regulate the movement of the audio unit Au on the rail 22, and the projecting portion is hooked to the receiving portion 30 provided to the securing portion 16, 18 when the audio unit Au is slid to the fixed position on the rail 22. However, the present invention is not limited to this style. For example, as shown in FIG. 22, audio unit side magnets 39 may be provided to the securing portions 16, 18 and control panel side magnets 38 may be provided to the rails 22 so that the counter poles of the audio unit side magnets 39 and the control panel side magnets 38 face each other. According to this construction, the securing portions 16, 18 are secured onto the control panel 2 by the magnetic force of the audio unit side magnets 39 and the control panel side magnets 38, and thus the movement of the audio unit Au on the rail 22 can be regulated. At this time, the present invention is not limited to the construction of the above-described embodiment in which the audio unit Au is secured by sliding the audio unit Au from the insertion portion 26 on the rail 22, and each audio unit Au may be directly attached without being slid on the control panel 2.

In the above-described embodiment, the audio units Au secured to the acoustic apparatus 100 contain the audio operating/equalizer unit Au-1, the audio player unit Au-2 and the radio unit Au-3, however the present invention is not limited to this style. They may contain an audio unit Au having another function. Furthermore, in the above-described embodiment, the tuner portion 32 and the antenna 33 are installed in the acoustic apparatus body 1. However, the present invention is not limited to this style, and they may be installed in the audio unit Au.

In the above-described embodiment, the acoustic apparatus body 1 has HDD 8, the sound reproducing portion 9, etc. However, the present invention is not limited to this style, and the acoustic apparatus body 1 may be designed so as to be equipped with a large output amplifier, a CD/DVD player, etc., and the take-in/out of CD/DVD may be carried out by opening/closing the control panel. In this case, the audio unit Au may be equipped with the operating portions of the large output amplifier, the CD/DVD player, etc.

In the above-described embodiment, the connection between the audio unit Au and the control panel 2 and the connection between the control panel 2 and the acoustic apparatus body 1 are performed by the common connectors 34 and the individual connectors 35. However, the present invention is not limited to this style. For example, the audio unit Au and the control panel 2 may be constructed so that the contact points provided to the audio unit Au and the control panel are brought into contact with each other and thus connected to each other when the audio unit Au is secured to the control panel, or the contact points provided to the control panel and the acoustic apparatus may be brought into contact with each other and thus connected to each other when the control panel is secured to the acoustic apparatus body.

The invention claimed is:

1. An on-vehicle acoustic apparatus comprising:
   a control panel provided to an acoustic apparatus body mounted in a vehicle; and
   plural audio units having different audio functions freely detachably provided to the control panel so as to be connected to the acoustic apparatus body through the control panel, wherein
   the control panel has plural connectors each of which freely secures any of the audio units.

2. The on-vehicle acoustic apparatus according to claim 1, wherein
   the control panel has one or more rail to which the plural audio units having different audio functions are freely secured.

3. The on-vehicle acoustic apparatus according to claim 2, wherein
   one or more insertion portion for inserting the plural audio units along the one or more rail is formed on a side surface of the control panel, and
   the control panel is fitted to a fitting portion provided to the acoustic apparatus body so as to hide the one or more insertion portion.

4. The on-vehicle acoustic apparatus according to claim 1, wherein
   the control panel is equipped with one or more projecting portion which is projected from the control panel to the plural audio units by one or more urging portion, and
   when the audio unit is located at a fixed position on the control panel, the one or more projecting portion is hooked to one or more receiving portion provided to the audio unit to fix the audio unit.

5. The on-vehicle acoustic apparatus according to claim 1, wherein
   the control panel and the plural audio units have magnets so that counter poles of the magnets face each other, and
   the plural audio units are fixed to the control panel by magnetic force of the magnets.

6. The on-vehicle acoustic apparatus according to claim 1, wherein
   the control panel has an interface portion which is electrically connected to the acoustic apparatus body, and
   the plural audio units are electrically connected to the acoustic apparatus body through the interface portion.

7. The on-vehicle acoustic apparatus according to claim 1, wherein
   the control panel has a common connector having plural control panel side terminals adaptable to the plural audio units and any connectable audio unit, and
   each of the plural audio units has an individual connector having audio unit side terminals corresponding to at least some of the plural control panel side terminals.

8. The on-vehicle acoustic apparatus according to claim 7, wherein
   the control panel has an interface portion which is electrically connected to the acoustic apparatus body, and
   the common connector is electrically connected to the acoustic apparatus body through the interface portion.

* * * * *